United States Patent Office.

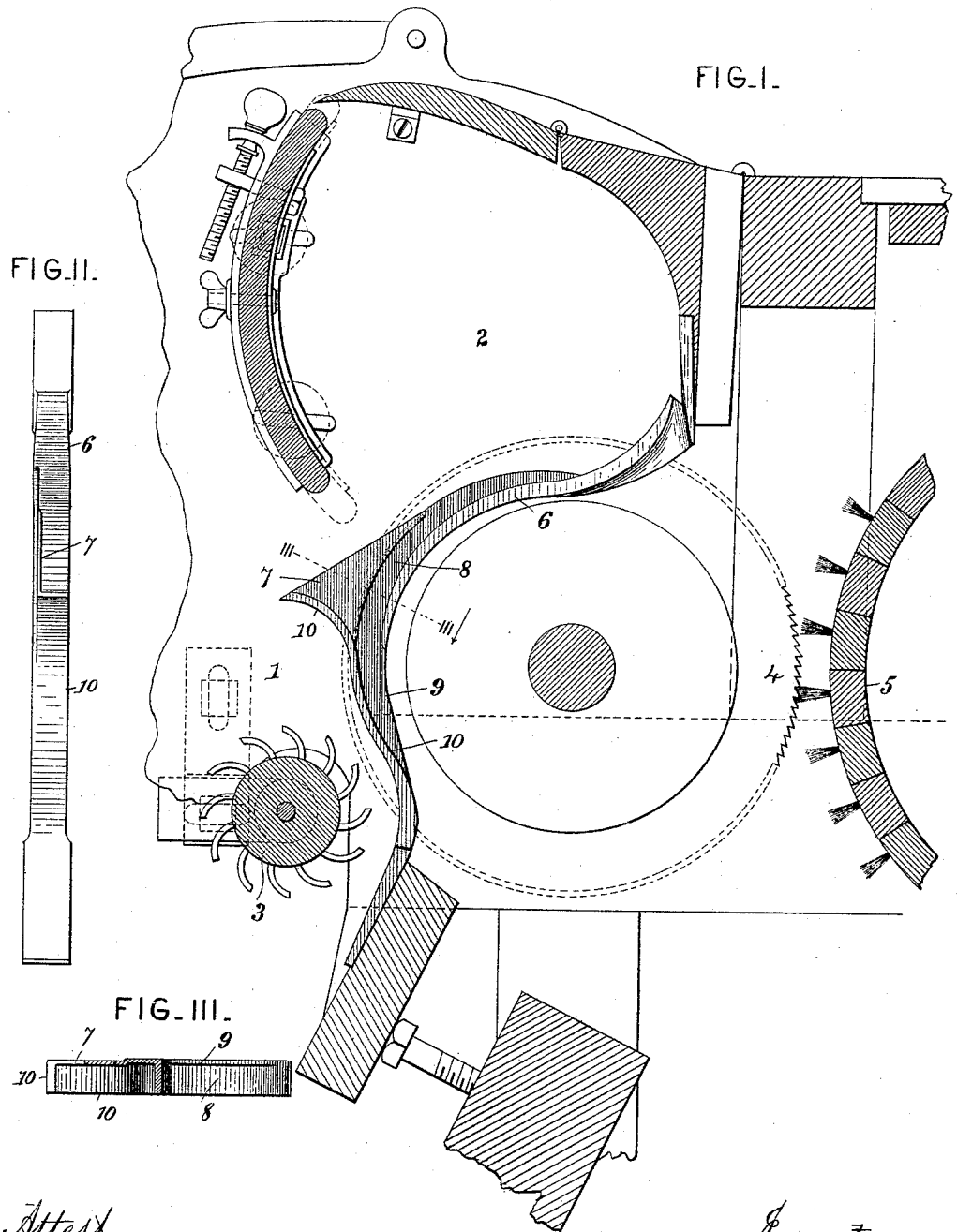

FERDINAND C. GAMMONS, OF BRIDGEWATER, MASSACHUSETTS, ASSIGNOR TO THE EAGLE COTTON GIN COMPANY, OF SAME PLACE.

COTTON-GIN.

SPECIFICATION forming part of Letters Patent No. 327,937, dated October 6, 1885.

Application filed May 28, 1885. Serial No. 166,951. (No model.)

*To all whom it may concern:*

Be it known that I, FERDINAND C. GAMMONS, a citizen of the United States, residing at Bridgewater, in the county of Plymouth and State of Massachusetts, have invented a new and useful Improvement in Cotton-Gins, of which the following is a specification.

My invention relates to that class of cotton-gins known as the "Eclipse Hulling-Gins," which serve the purpose of separating the hulls from the cotton as well as ginning it. An illustration of a machine of this type may be seen in Letters Patent No. 20,120, granted April 27, 1858, to Wilson and Payne.

In these gins, as customarily constructed, the ribs forming the breast of the gin are provided at approximately their mid-length with flanges, between which the teeth of the saws pass in such a manner as to carry with them the seed-cotton without the hulls and trash. The passages between these flanges are necessarily made so narrow as to prevent the seed-cotton from going through them rapidly, and the consequence is that a large proportion of the seed-cotton passes over the outside of the flanges to and from the upper-roll chamber. A further difficulty with such gins is that the seed and hulls being discharged together the seed is rendered unsalable.

In my application for Letters Patent of the United States filed on the 11th day of May, 1885, Serial No. 165,145, I have described and claimed certain devices for obviating these difficulties. My present invention consists in an additional modification in the form of the rib, adapted to more perfectly secure the same advantages—namely, the complete separation of the seed from the cotton and hulls and its discharge in rear of the huller-cylinder.

In order that the invention may be better understood, I will proceed to describe it with reference to the accompanying drawings, in which—

Figure I is a vertical sectional view of the hopper and saws and adjacent parts of a gin embracing my improved rib. Fig. II is a front elevation of a single rib. Fig. III is a sectional view of a rib on the line III III, Fig. I.

1 is the hulling, and 2 the ginning, chamber, 3 the huller, 4 the saws, and 5 the brush-cylinder, of a gin of any preferred construction.

6 represents one of the ribs forming the breast of a gin. Each rib is provided with a flange, 7, projecting beyond the saw-teeth, so that the saw will pass twice through the breast, submitting the cotton to a double action for the purpose, first, of hulling it, and, second, of ginning it.

To enable the free passage of the seed-cotton and cleaned seed between the flanges, and at the same time enable the bottoms of said flanges to be thickened sufficiently to come almost in contact with the sides of the saw, I provide at the rear of the flange a groove, 8, curved to follow the form of the rib, as shown. Immediately below or in rear of the flange the body of the rib is cut away, as shown at 9. By this arrangement it will be seen that not only is the seed-cotton allowed to pass freely up from the hulling to the ginning chamber, but the cleaned cotton-seed is allowed to fall directly from the ginning-chamber through the passage 8 and 9 to the rear of the breast, and thus separate it from the hulls and trash, which are discharged over the huller-cylinder in customary manner.

As thus far described, the invention herein shown is substantially identical with that shown in my application before referred to, and is not herein claimed. In order, however, to effect a more complete separation of the seed from the cotton and hulls, I form on the side of the flange 7 a lateral projection, 10, which overhangs the cut-away portion 9 of the rib 6, and is of sufficient length to extend below it, where it is united with the body of the rib, as shown, so as to materially aid in strengthening the same at its weakest part. It will be seen that when thus extended the projection serves as a shield around the opening 9 in the rib to entirely separate the cotton-seed from the cotton, hulls, and trash in the hulling-chamber, and to discharge them through the breast in rear of the huller-cylinder.

Having thus described my invention, the following is what I claim as new therein and desire to secure by Letters Patent:

1. A cotton-gin rib having a cut-away portion, as shown, and a shield or guard overhanging said cut-away portion, substantially as and for the purpose set forth.

2. A rib for a huller-gin, having a flange projecting therefrom, a cut-away portion, as described, and a lateral projection from said flange overhanging said cut-away portion and extending below it, substantially as and for the purpose set forth.

3. A rib for a huller-gin, having a cut-away portion, a flange projecting from said rib at the side of said cut-away portion, and a lateral projection from said flange overhanging said cut-away portion, and joined at its lower extremity to the rib, substantially as set forth.

FERDINAND C. GAMMONS.

Witnesses:
  JOSEPH TOOKER,
  HOSEA KINGMAN.